No. 641,762. Patented Jan. 23, 1900.
H. C. CLAY.
COMPOUND ENGINE.
(Application filed May 11, 1899.)
(No Model.) 5 Sheets—Sheet 1.
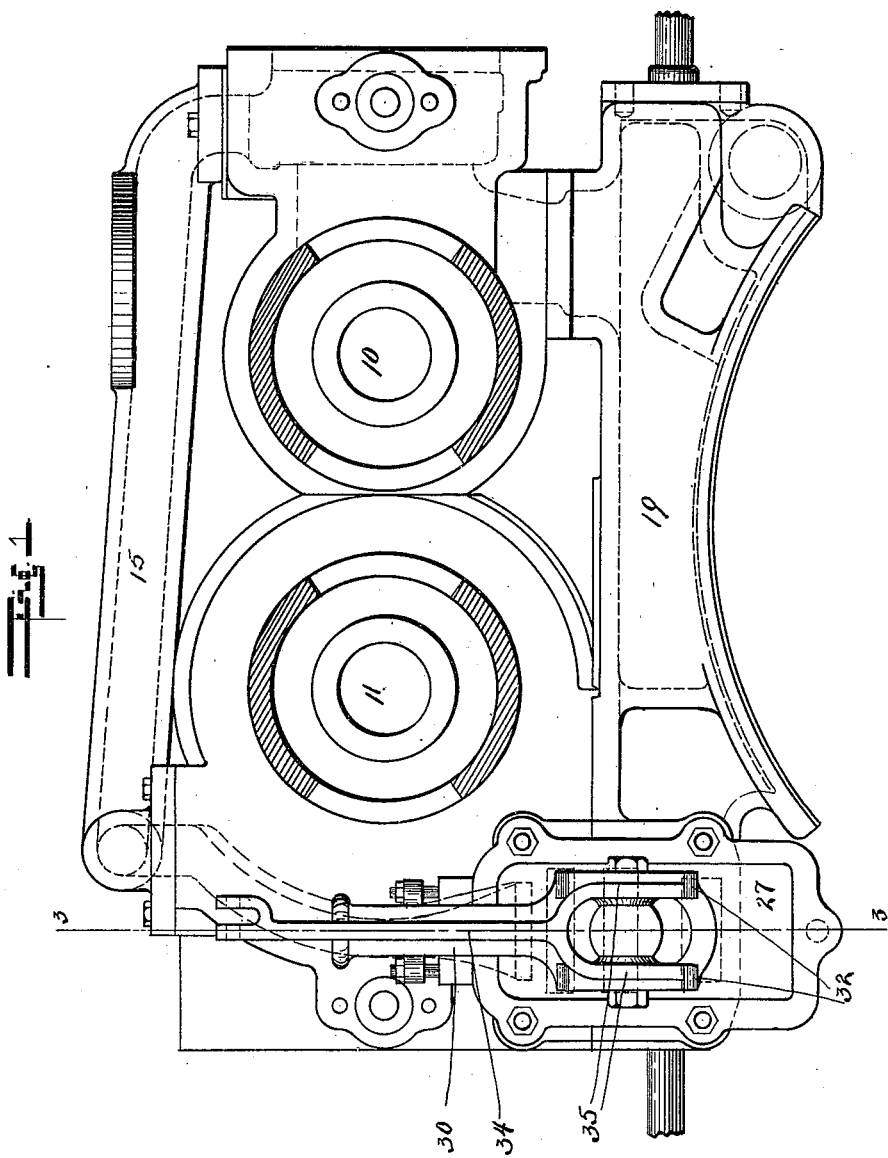
WITNESSES:
Frank A. Fable
V. M. Hood.
INVENTOR
Harry C. Clay.
BY
Arthur M. Hood
ATTORNEY.

No. 641,762. Patented Jan. 23, 1900.
H. C. CLAY.
COMPOUND ENGINE.
(Application filed May 11, 1899.)
(No Model.) 5 Sheets—Sheet 2.
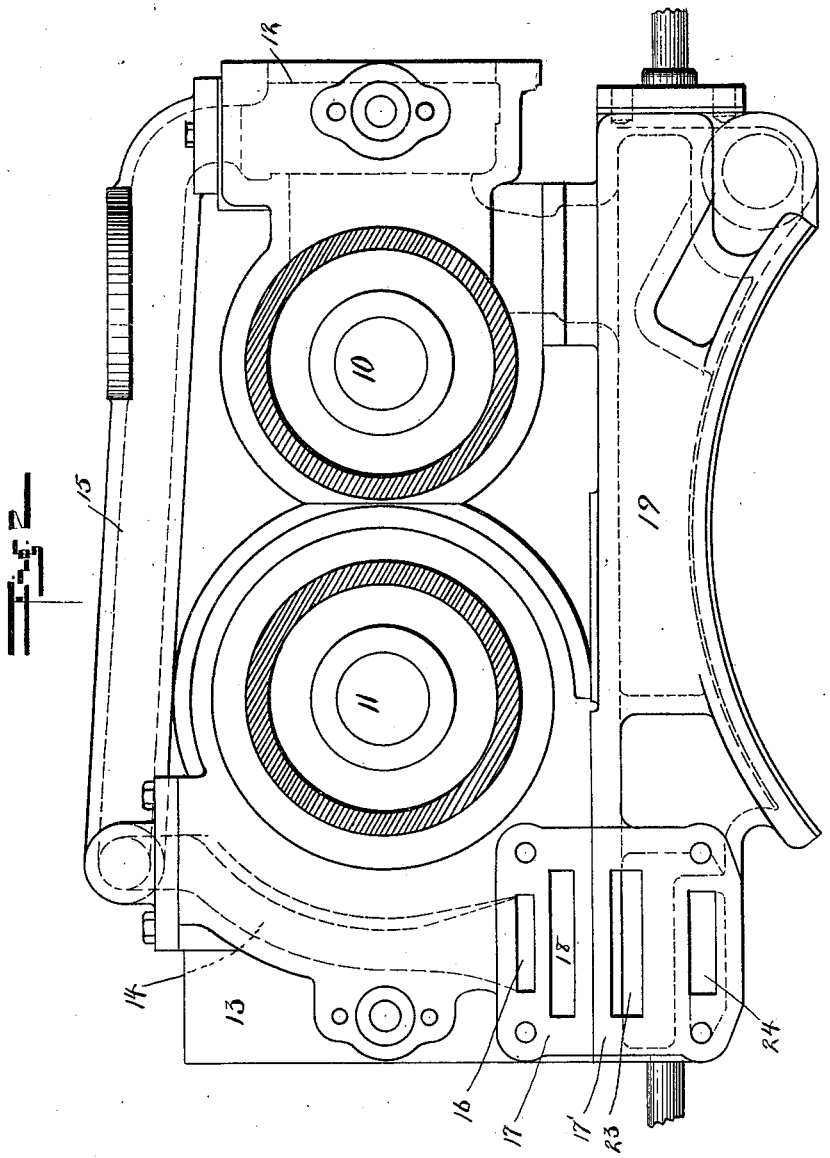

No. 641,762. Patented Jan. 23, 1900.
H. C. CLAY.
COMPOUND ENGINE.
(Application filed May 11, 1899.)
(No Model.) 5 Sheets—Sheet 3.
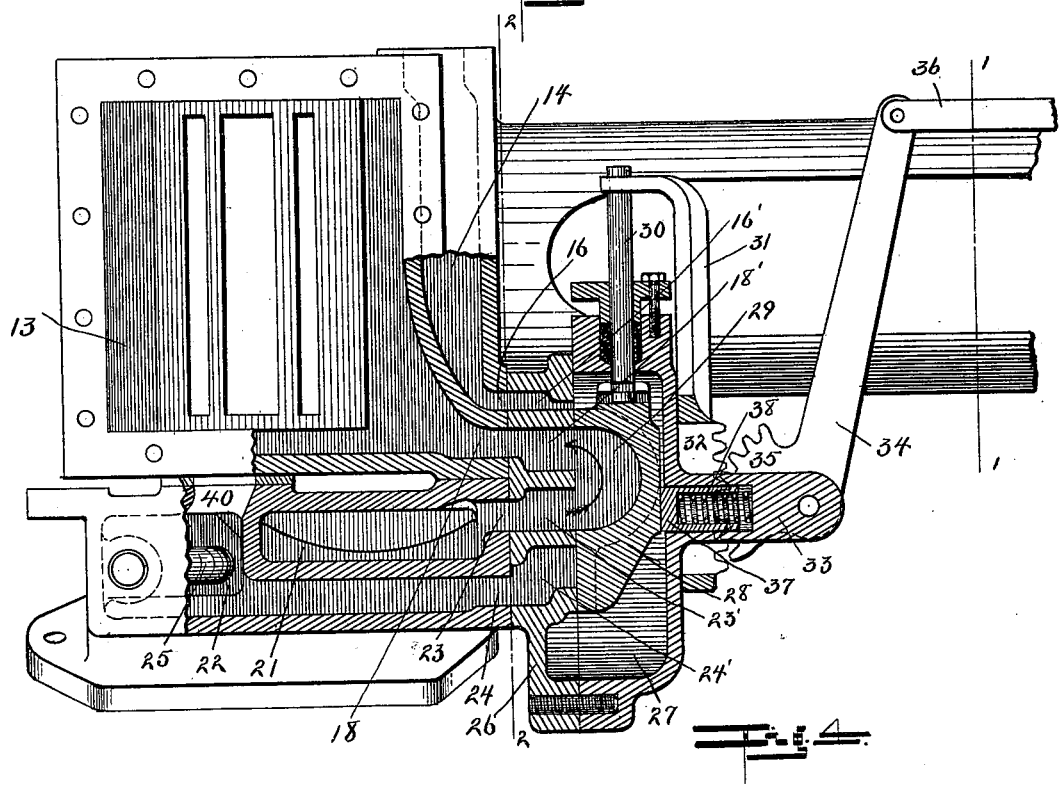
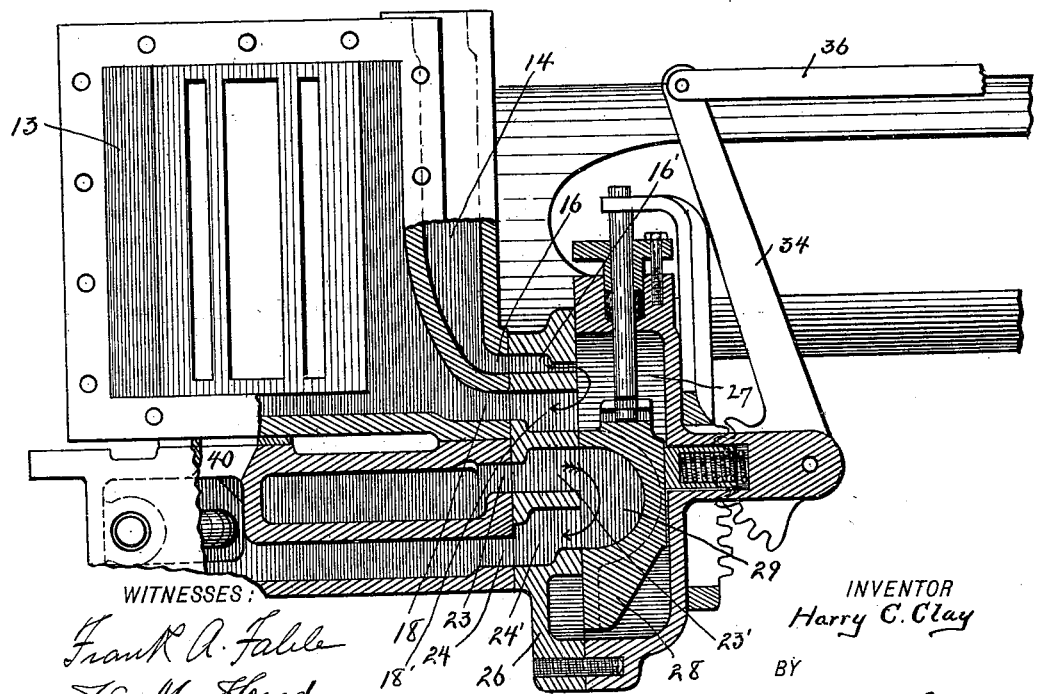
WITNESSES:
Frank A. Faleb
V. M. Hood.
INVENTOR
Harry C. Clay
BY
Arthur M. Hood
ATTORNEY.

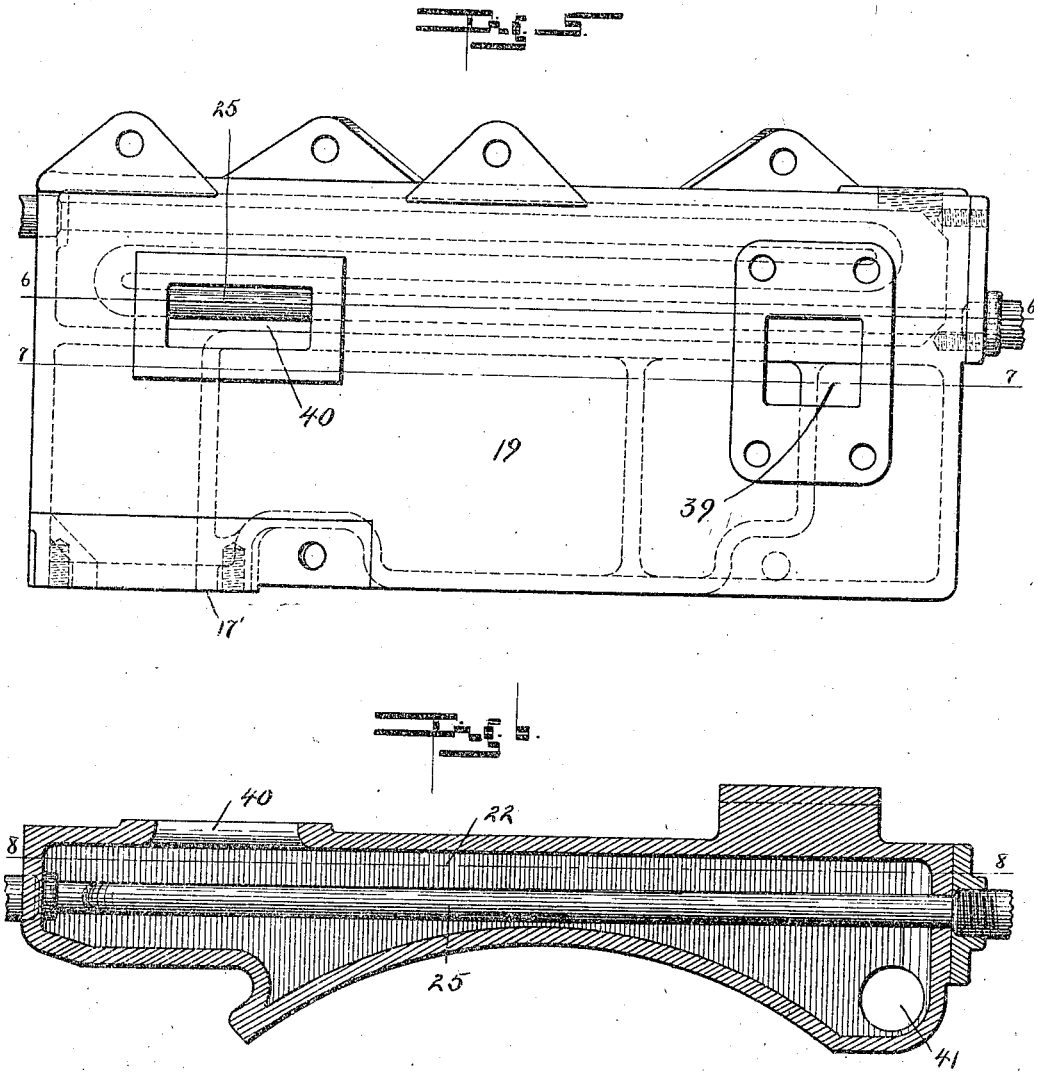

No. 641,762. Patented Jan. 23, 1900.
H. C. CLAY.
COMPOUND ENGINE.
(Application filed May 11, 1899.)
(No Model.) 5 Sheets—Sheet 5.
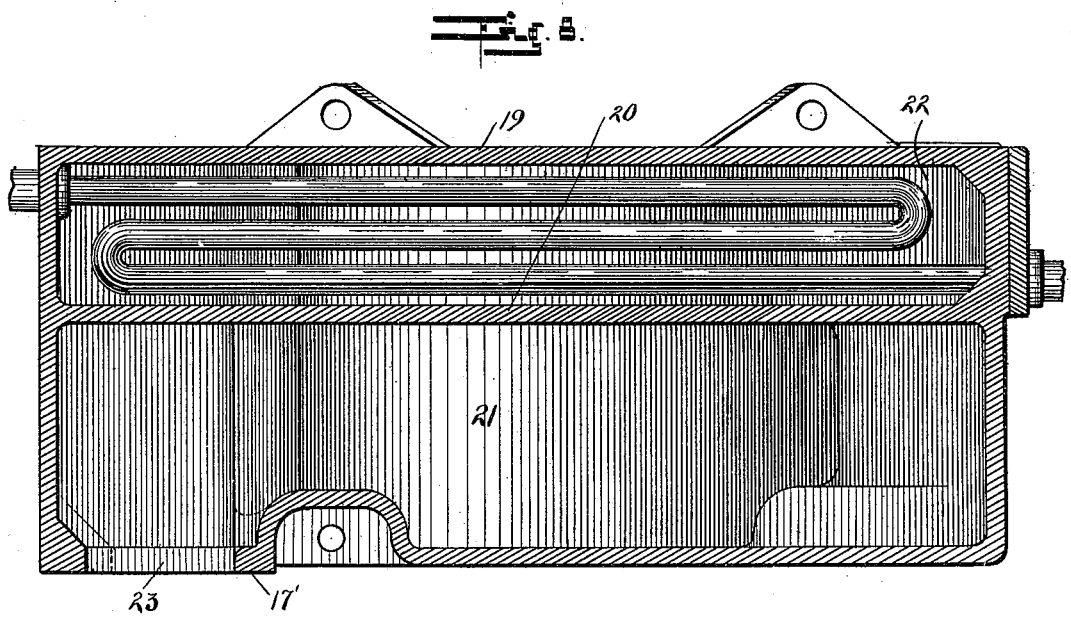
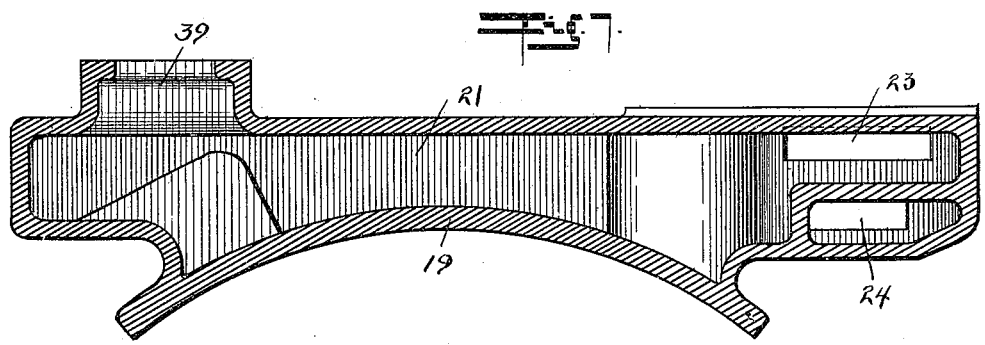
WITNESSES:
Frank A. Fable
V. M. Hood
INVENTOR
Harry C. Clay
BY
Arthur M. Hood
ATTORNEY.

UNITED STATES PATENT OFFICE.

HARRY C. CLAY, OF COLUMBUS, INDIANA, ASSIGNOR TO THE REEVES & COMPANY, OF SAME PLACE.

COMPOUND ENGINE.

SPECIFICATION forming part of Letters Patent No. 641,762, dated January 23, 1900.

Application filed May 11, 1899. Serial No. 716,357. (No model.)

*To all whom it may concern:*

Be it known that I, HARRY C. CLAY, a citizen of the United States, residing at Columbus, in the county of Bartholomew and State of Indiana, have invented a new and useful Compound Engine, of which the following is a specification.

My invention relates to an improvement in compound engines.

The object of my invention is to provide means by which a compound engine may be easily and quickly changed to a simple engine using initial-pressure steam in both cylinders, and vice versa.

A further object of my invention is to compactly arrange the shifting mechanism for use in connection with portable engines, such as traction-engines, and to provide means by which the exhaust-steam may be caused to heat the feed-water.

The accompanying drawings illustrate my invention.

Figure 1 is a section on line 1 1 of Fig. 3. Fig. 2 is a section on line 2 2 of Fig. 3. Fig. 3 is a section on line 3 3 of Fig. 1 with the parts arranged for the engine to run compound. Fig. 4 is a similar section with the parts arranged for the engine to run simple. Fig. 5 is a plan of the receiver and heater. Fig. 6 is a section on line 6 6 of Fig. 5. Fig. 7 is a section on line 7 7 of Fig. 5. Fig. 8 is a horizontal section on line 8 8 of Fig. 6.

In the drawings, 10 indicates the smaller or high-pressure cylinder, and 11 indicates the larger or low-pressure cylinder. Cylinder 10 is provided with the usual steam-chest 12 and cylinder 11 with steam-chest 13, the usual valves (not shown) being mounted in each chest. The low-pressure cylinder is formed with a steam-passage 14, between the upper end of which and the chest 12 extends a bridge-pipe 15, to which initial-pressure steam is conducted. The lower end of passage 14 is throttled to form a port 16, which lies in a face 17, formed at one end of the chest 13 of the low-pressure cylinder. Formed in face 17, beneath port 16, is a port 18, which leads to the low-pressure chest 13. Both cylinders are bolted to the upper face of a hollow base 19. In the drawings base 19 is formed on its lower face, so as to rest directly upon a boiler of the type usually used in traction-engines. Base 19 is divided transversely by a wall 20 into a receiver 21 and a heater 22, and said base is provided with a face 17', which registers with and forms a continuation of the face 17 of chest 13. Receiver 21 discharges through a port 23, formed in face 17', and beneath said port is an exhaust-port 24, which leads from said face beneath receiver 21 to the heater 22. Mounted in heater 22 is a coil of pipe 25, through which the feed-water is passed.

As previously stated, faces 17 and 17' form a continuous plane, and upon the face thus formed is secured a valve-plate 26, having ports 16', 18', 23', and 24', which extend through the valve-plate and register with the ports 16, 18, 23, and 24, respectively. Secured to plate 26 is a valve-chamber 27, in which is mounted a slide-valve 28, having a passage 29, adapted to connect ports 18' and 23' or 23' and 24'. Valve 28 is provided with a stem 30, to the outer end of which is secured one end of an operating-arm 31. Arm 31 is provided with a pair of racks 32, which extend down upon each side of a central boss 33. To the end of boss 33 is pivoted a lever 34, the inner end of which is provided with segmental gears 35, which mesh with racks 32. The outer end of lever 34 is provided with a link 36, by which it may be operated. Boss 33 is hollow, and mounted therein is a thimble 37, which is forced into engagement with valve 28 by a spring 38, the valve being thereby held to its seat on plate 26.

Cylinder 10 exhausts directly into receiver 21 through passage 39 and cylinder 11 exhausts into the heater 22 through passage 40.

The operation is as follows: Suppose the engine to be run compound. The outer end of lever 34 is thrown out, thus raising valve 28 to the position shown in Fig. 3, the passage 29 forming communication between ports 23' and 18', and consequently forming communication between the receiver 21 and chest 13 of the low-pressure cylinder 11 and covering exhaust-port 24'. With the valve 28 in this position the exhaust from cylinder 10 passes into receiver 21 and from there through ports 23' and 18' into heater 22, exhausting from said heater through pipe 41, Fig. 6. To cause the engine to run simple, valve 28 is thrown down so as to connect ports 23' and 24', this movement at the same time allowing communication through chamber 27 between ports 16' and 18'. In this position initial-pressure steam passes through passage 14 into chamber 27 and through port 18' into the chest of the low-pressure cylinder and exhausts into the heater. At the same time the exhaust from the high-pressure cylinder 10 passes into the receiver 21 and from there through ports 23' and 24' into the heater. Port 16' should be so contracted that the initial-pressure steam passing therethrough to the low-pressure cylinder will bear such ratio to the amount of steam passing into the high-pressure cylinder that the power developed in the two cylinders will be the same.

It will be readily understood that the valve-plate 26 is not absolutely essential, it being possible to mount valve 28 directly upon faces 17 17'; but the interposition of the valve-plate is advisable for convenience of construction and accuracy of fitting.

I claim as my invention—

1. In a compound engine, the combination with the high and low pressure cylinders, of a receiver, receiving the exhaust from the high-pressure cylinder, a feed-water heater receiving exhaust from the low-pressure cylinder, an auxiliary high-pressure passage, and a valve arranged to be thrown so as to cut off the heater from the receiver and allow communication between the receiver and low-pressure cylinder, or to connect the receiver and heater and allow communication between the auxiliary passage and the low-pressure cylinder.

2. In a compound engine, the combination with the high and low pressure cylinders, of a receiver, receiving the exhaust from the high-pressure cylinder, a feed-water heater receiving exhaust from the low-pressure cylinder, a valve-chamber, a port leading from said chamber to the heater, a high-pressure passage leading into said chamber, and a valve mounted in said chamber, the said valve arranged to be thrown so as to cut off the heater from the receiver and allow communication between the receiver and low-pressure cylinder, or to connect the receiver and heater and allow communication between the high-pressure passage and the low-pressure cylinder.

3. In a compound engine, the combination with the high and low pressure cylinders, of a receiver receiving the exhaust from the high-pressure cylinder, a port leading from said receiver, a port leading to the low-pressure cylinder, a high-pressure port, and an exhaust-port, a removable valve-plate having a series of ports corresponding to and registering with said ports, a valve-chamber mounted upon said plate and inclosing said ports, a slide-valve mounted in said chamber on the valve-plate, and means for throwing said valve whereby the exhaust-port may be closed and communication formed between the receiver and low-pressure cylinder, or the receiver and exhaust connected and communication formed between the high-pressure port and the low-pressure cylinder.

4. In a compound engine, the combination with the high and low pressure cylinders, of a receiver receiving the exhaust from the high-pressure cylinder, a heater receiving the exhaust from the low-pressure cylinder, a port leading from said receiver, a port leading to the low-pressure cylinder, an exhaust-port leading into the heater, and a high-pressure port, a valve-plate having a series of ports corresponding to and registering with said ports, a valve-chamber inclosing said ports, a slide-valve mounted in said chamber on the valve-plate, and means for throwing said valve whereby the exhaust-port may be closed and communication formed between the receiver and the low-pressure cylinder, or the receiver and heater be connected through the exhaust and communication formed between the high-pressure port and the low-pressure cylinder.

5. In a compound engine, a casing extending between and arranged to support the high and low pressure cylinders, a receiving-chamber formed in said casing, a passage leading from the high-pressure exhaust into said receiving-chamber, a heating-chamber formed in said casing and having suitable feed-water conductors mounted therein, an exhaust-passage leading from the low-pressure cylinder into said heater, a port-face formed upon adjacent portions of the low-pressure cylinder and said casing, a high-pressure port opening into said face, a port leading from said face to the low-pressure cylinder, a port leading into said face from the receiver, a port leading from said face to the heater, a valve, and means for throwing said valve whereby a connection may be established between the high-pressure port and low-pressure cylinder and between the receiver and heater, or communication established between the receiver and low-pressure cylinder and the heater-port closed.

6. In a compound engine, a casing extending between and arranged to support the high and low pressure cylinders, a receiving-chamber formed in said casing, a passage leading from the high-pressure exhaust into said receiving-chamber, a heating-chamber formed in said casing and having suitable feed-water conductors mounted therein, an exhaust-passage leading from the low-pressure cylinder into said heater, a port-face formed upon adjacent portions of the low-pressure cylinder and said casing, a high-pressure port opening into said face, a port leading from said face to the low-pressure cylinder, a port leading into said face from the receiver, a port leading from said face to the heater, a removable valve-plate provided with openings therethrough corresponding to the ports before mentioned, a slide-valve mounted upon said plate, a valve-chamber inclosing said valve and said ports, and means for throwing said valve so as to close the port leading to the heater and establish communication between the receiver and low-pressure cylinder, or so as to establish communication between the receiver and heater and between the high-pressure port and low-pressure cylinder.

HARRY C. CLAY.

Witnesses:
ALLEN C. DENISON,
B. M. HAMILTON.